No. 761,189. Patented May 31, 1904.

UNITED STATES PATENT OFFICE.

THOMAS B. ALDRICH, OF DETROIT, MICHIGAN.

PROCESS OF MAKING HALOGEN-TERTIARY-BUTYL ALCOHOL.

SPECIFICATION forming part of Letters Patent No. 761,189, dated May 31, 1904.

Application filed August 21, 1901. Serial No. 72,772. (No specimens.)

*To all whom it may concern:*

Be it known that I, THOMAS B. ALDRICH, a citizen of the United States, residing at Detroit, in the county of Wayne and State of Michigan, have invented certain new and useful Improvements in Processes of Manufacturing Halogen-Tertiary-Butyl Alcohols, of which the following is a specification.

The invention relates to the art of producing halogen-tertiary-butyl alcohols.

The invention more particularly consists in a novel process for the production of a specified compound tri-brom-tertiary-butyl alcohol; but in its broader application it may be employed for the manufacture of other compounds of the class.

Heretofore, so far as I am aware, tri-brom-tertiary-butyl alchohol has only been produced in an experimental way and by a process similar to the old method for manufacturing the analogous compound tri-chlor-tertiary-butyl alcohol. In the said old process a mixture of a halogen substitution product, such as chloroform or bromoform, and a ketone, such as acetone, is treated with a condensing agent, such as caustic alkali, the relative quantity of the latter being about ten per cent. of the mixture of the other two materials. The resulting product is tri-chlor-tertiary-butyl alcohol or tri-brom-tertiary-butyl alcohol, according to the particular halogen substitution product used, said product being formed by the molecular union of the two materials forming the mixture caused by the condensing agent. Some of the objections to the old process are, first, that the yield of the product is comparatively small; second, that in the formation of the product a considerable quantity of objectionable by-products are formed from which the desired product must be subsequently separated, and, third, in the formation of these useless by-products a considerable quantity of the more costly of the materials (chloroform or bromoform) is destroyed.

The present invention is based on the discovery that the yield of the desired product is materially increased and the formation of objectionable by-products and the destruction of the materials is greatly diminished by the use of a relatively small quantity of condensing agent. As before stated, the quantity of condensing agent heretofore used has been not less than ten per cent. of the mixed materials. With my improved process I have discovered that the best results are obtained by the use of from one-fourth to one and one-half per cent. of the condensing agent and that progressively better results over the old process (with a corresponding saving of material) are obtained by diminishing the quantity of condensing agent from ten per cent. downward.

A further feature of the present invention consists in the improved manner of separating the desired product from the mixture in which it is formed. Heretofore it has been accomplished by distilling off the excess of acetone and chloroform or bromoform under atmospheric pressure. The objection to such treatment is that the necessary rise in temperature to effect the distillation will cause the caustic alkali still contained in the solution to attack both the product and the halogen substitution material from which said product is formed. This causes the before-mentioned threefold objection—that undesirable by-products are formed, the yield of the desired product decreased, and costly material is destroyed. With my improved process this is avoided by distilling the mixture under reduced pressure, thereby effecting the removal of the uncombined materials without greatly raising the temperature. Another advantage is that by this treatment in the formation of tri-brom-tertiary-butyl alcohol the bromoform may be more perfectly eliminated, and as the product is soluble in bromoform the complete removal of the latter favors the subsequent treatment of the product in effecting a complete disisolation.

Having thus generally described the features of my improved process, I shall now describe the specific application to the manufacture of tri-brom-tertiary-butyl alcohol. The necessary materials are, first, a ketone, such as acetone, and, second, a bromin substitution product, such as bromoform. These materials are mixed in about equal weights of each and then treated with a condensing agent. For the latter caustic alkali may be used or, if desired, barium hydrate, sodium peroxid, soda-lime, or any other condensing agent which may be found suitable. Where the caustic alkali is used, a quantity thereof equaling from one-fourth to one and one-half per cent. of the mixed materials has been found to give the best results. The alkali may be mixed in powdered form or brought in contact with the mixture in any other suitable way. Before treating the mixture with the alkali it is preferably dehydrated with a a suitable agent, cooled down to a temperature of 0° centigrade or even lower, and this temperature is maintained constant as far as practical during the reaction, which latter requires but a short time. At the end of the reaction the mixture is drawn into a vacuum-still where the excess of acetone and bromoform are distilled off and collected to be used again. In this step of the process it is important that all of the bromoform be removed, for the reason hereinbefore set forth. The residue may then be distilled with steam, which carries over the product, and thus obtains it in a purer form, or it may be purified in other ways. It is then separated by filtration and dried, after which it may be further purified by recrystallization from a solvent, such as alcohol, or by sublimation. The yield of the product obtained by this process should equal about twenty per cent. of the mixture or forty per cent. of the bromoform used. The advantage of removing all of the bromoform before the distillation of the product is that if any bromoform were present in this latter step it would distil with the product and in condensing would form a solvent for the product, which would render its disisolation more difficult.

In carrying out my process any suitable apparatus may be employed, and as the latter forms no part of the present invention I have deemed it unnecessary to illustrate the same by drawings.

What I claim as my invention is—

1. In the art of producing halogen-tertiary-butyl alcohols, the method of effecting a molecular union between the ketone and a halogen substitution product, the same consisting in treating a mixture of the said materials with a relatively small quantity of a condensing agent constituting less than ten per cent. of the mixture for the purpose set forth.

2. A process of manufacturing tri-brom-tertiary-butyl alcohol which consists in treating a mixture of a ketone and a bromin substitution product with a relatively small quantity of a condensing agent constituting less than ten per cent. of the mixture for the purpose set forth.

3. A process of manufacturing tri-brom-tertiary-butyl alcohol which consists in treating a mixture of acetone and bromoform with a relatively small quantity of caustic alkali constituting less than ten per cent. of the mixture for the purpose set forth.

4. A process for manufacturing tri-brom-tertiary-butyl alcohol which consists in first treating a mixture of acetone and bromoform with a condensing agent and after the reaction of the latter has ceased in distilling the mixture under reduced pressure to completely remove the excess of acetone and bromoform and in subsequently distilling the residue with steam.

In testimony whereof I affix my signature in presence of two witnesses.

THOMAS B. ALDRICH.

Witnesses:
M. B. O'DOGHERTY,
H. C. SMITH.